R. COOK.
BALL BEARING.
APPLICATION FILED MAR. 1, 1909.

989,569.  Patented Apr. 18, 1911.

WITNESSES.

INVENTOR.
R. COOK,

UNITED STATES PATENT OFFICE.

RICHARD COOK, OF BERLIN, ONTARIO, CANADA, ASSIGNOR OF ONE-HALF TO GEORGE ARTHUR BOWMAN, OF CONESTOGO, CANADA.

BALL-BEARING.

989,569.  Specification of Letters Patent.  Patented Apr. 18, 1911.

Application filed March 1, 1909. Serial No. 480,687.

*To all whom it may concern:*

Be it known that I, RICHARD COOK, a subject of the King of Great Britain, and resident of the town of Berlin, in the county of Waterloo, in the Province of Ontario, Canada, have invented certain new and useful Improvements in Ball-Bearings, of which the following is the specification.

My invention relates to improvements in ball bearings, and the object of the invention is to devise a form of ball bearing and container therefor, which may be readily applied to axles of railway cars and heavy motor vehicles particularly.

A further object is to make the bearing of such a character as will enable it to be readily increased in length, so as to increase the number of balls and cones according to the load to be carried.

Further objects are to make the bearing extremely simple, interchangeable, dust proof and oil containing.

Yet further objects are to make the bearing, such that it is not necessary to employ any skilled mechanic to adjust or assemble the bearing.

A yet further object is to so construct the bearing as to enable it to be applied to any axle within certain limits by simply changing the size of the bushing.

To effect these objects my bearing is constructed in the manner, which I shall describe hereinafter, reference being made to the accompanying drawings, in which—

Figure 1:
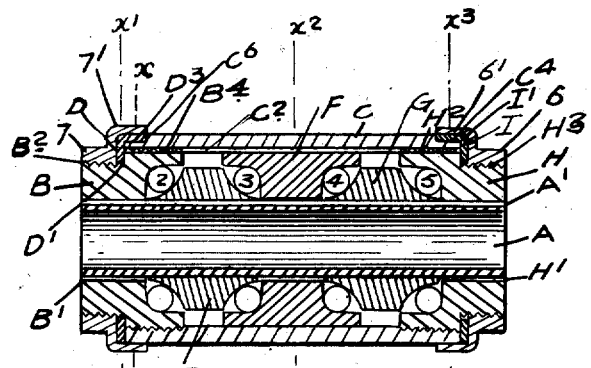
Figure 2:
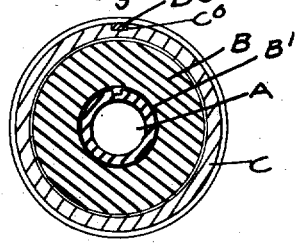
Figure 5:
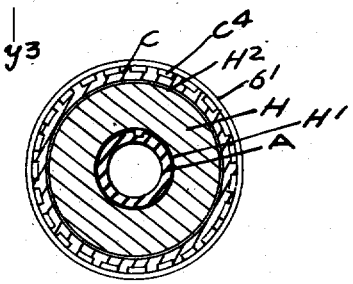
Figure 3:
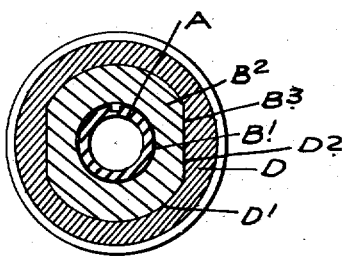
Figure 6:
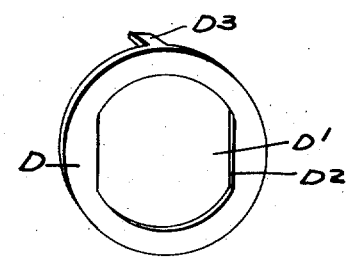
Figure 4:
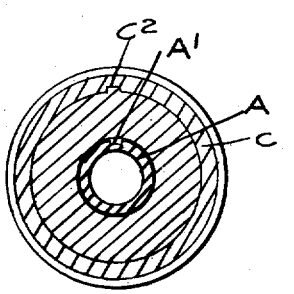

Figure 1, is a longitudinal section through the bearing. Fig. 2, is a cross section on the line $x-y$ Fig. 1. Fig. 3, is a cross section on the line $x'-y'$ Fig. 1. Fig. 4, is a cross section on the line $x^2-y^2$ Fig. 1. Fig. 5, is a cross section on the line $x^3-y^3$ Fig. 1. Fig. 6, is a detail of the washer.

In the drawings like letters of reference indicate corresponding parts in each figure.

A is a bushing, which may be made of any external diameter or internal diameter to fit the size of the shaft to which it is to be applied. The bushing A has a longitudinal keyway A' formed on the same.

B is the end cone, which is provided with an enlarged orifice B', so as to clear the bushing A and thereby hold the cone clear of the bushing when it is being screwed into place. The inner end of the cone is formed in the usual manner. The cone is provided with a reduced threaded outer end $B^2$ having two flat sides $B^3$ diametrically opposite each other (see Fig. 3.) The inner end of the cone is also provided with a threaded portion $B^4$.

C is the container, which is internally threaded and is fitted on to the threaded inner portion $B^4$ of the end cone B.

D is a washer provided with a central orifice D' having flat sides $D^2$, the orifice with the flat sides being designed to fit the flat sided reduced end $B^3$ of the end cone B. The washer D is also provided with a projection $D^3$ designed to fit into a notch $C^5$ on the fixed end of the container C (see Figs. 1, 2 and 6). The container C is provided with a key $C^2$ as indicated (see particularly Figs. 1 and 4).

E is a double cone provided with a key slot fitting on to the keyway A' of the bushing A.

F is a double cone reversely formed to the cone E and provided with a key fitting into the keyway $C^2$ of the container C.

G is a double cone formed exactly the same as the cone E and having a key fitting into the keyway A' of the central bushing A.

H is the end cone, which has a central orifice H' formed large enough to clear the bushing A, and has a screw spindle $H^2$, which is screwed into the internal thread $C^3$ of the container C.

2, 3, 4 and 5 are four circles of balls located respectively between the cones B and E, E and E, F and G and G and H. The end cone H has a reduced threaded outer end $H^3$, which is flattened similarly to the threaded reduced outer end of the opposite end cone B.

I is a washer similarly formed to the washer D.

The container C is provided with a circle of end notches $C^4$ and the washer I fits upon the reduced threaded end $H^3$ and the lug I' thereof fits into one of the notches $C^4$, the lug being fitted into any desired notch $C^4$, this depending, of course, upon how far the screw and cone H is screwed into the container C, so as to take up the wear of the balls and maintain all the balls from end to end, so as to have a perfect rolling contact with their respective cones.

6 is an end cap, which is screwed onto the reduced outer end of the cone H. The cap 6 is provided with an annular flange 6', which fits over the end of the container C.

7 is a screw cap formed in exactly the same way as the screw cap 6 and provided with an annular flange 7', which fits over the opposite end of the container C.

The screw caps 6 and 7 formed as described serve to secure the bearing from the ingress of dust.

The spaces between the cones and the balls may be filled with oil, if desired, and it will be retained in the bearing by reason of the caps 6 and 7.

The container C being provided with a circle of notches C⁴ enables the end cone H to be screwed to the desired tightness as hereinbefore described, so that the washer can be adjusted to retain the cone in the position to which it is screwed by the projection I' fitting into the notch required.

Such a bearing as I describe is as will be readily seen from this description very simple, easily made and may be extended to any length by providing a longer bushing and container and by simply duplicating the double cones and the balls, which is an important desideratum.

What I claim as my invention is:

1. A ball bearing comprising an inner bushing having a suitable central aperture and a longitudinal keyway, an end cone provided with a central orifice large enough to clear the bushing and a reduced portion and an inner threaded portion, a container having both ends internally threaded, one end fitting such threaded portion of the cone, said container having a longitudinal internal keyway extending from end to end of the same, an inner double cone provided with a key to fit the keyway in the bushing, a second end cone provided with a reduced outer end and an inner threaded end to fit within the correspondingly internally threaded end of the container, said reduced ends of the end cones having flat sides, a washer for each end cone provided with a circular recess having flat sides to fit the flat sides of the reduced end of the cone and a projection on one washer fitting into a notch in the end of the container and means at the opposite end of the container for adjusting the second end cone and holding the same in the position to which it is adjusted as and for the purpose specified.

2. A ball bearing comprising an inner bushing having a suitable central aperture and a longitudinal keyway, an end cone provided with a central orifice large enough to clear the bushing, and a reduced threaded portion and an inner threaded portion, a container having both ends internally threaded, one end fitting such threaded inner portion and provided with a longitudinal internal keyway extending from end to end of the same, an inner double cone provided with a key to fit the keyway on the bushing, a second end cone provided with a reduced outer threaded end having flattened sides and an inner threaded end to fit within the correspondingly internally threaded end of the container, means at one end of the container for securely holding the first cone in position, a washer provided with a recess having flattened sides to fit the flattened sides of the reduced threaded end of the second end cone, and a projection forming part of the washer, the container at this end being provided with a circle of notches with which said projection is designed to co-act as and for the purpose specified.

RICHARD X COOK.
his mark

Witnesses:
B. BOYD,
R. COBAIN.